(No Model.)

F. KABURICK.
DISK HARROW.

No. 470,761. Patented Mar. 15, 1892.

ATTEST
Helen Graham
William Graham

INVENTOR
FRANK KABURICK
by his attorney
L. P. Graham

UNITED STATES PATENT OFFICE.

FRANK KABURICK, OF CARLINVILLE, ILLINOIS.

DISK HARROW.

SPECIFICATION forming part of Letters Patent No. 470,761, dated March 15, 1892.

Application filed April 29, 1891. Serial No. 390,965. (No model.)

*To all whom it may concern:*

Be it known that I, FRANK KABURICK, of Carlinville, in the county of Macoupin and State of Illinois, have invented certain new and useful Improvements in Disk Harrows, of which the following is a specification.

This invention relates to disk harrows, which may be also used as cultivators; and it consists in the details of construction and combinations of parts hereinafter set forth and claimed.

Figure 1:
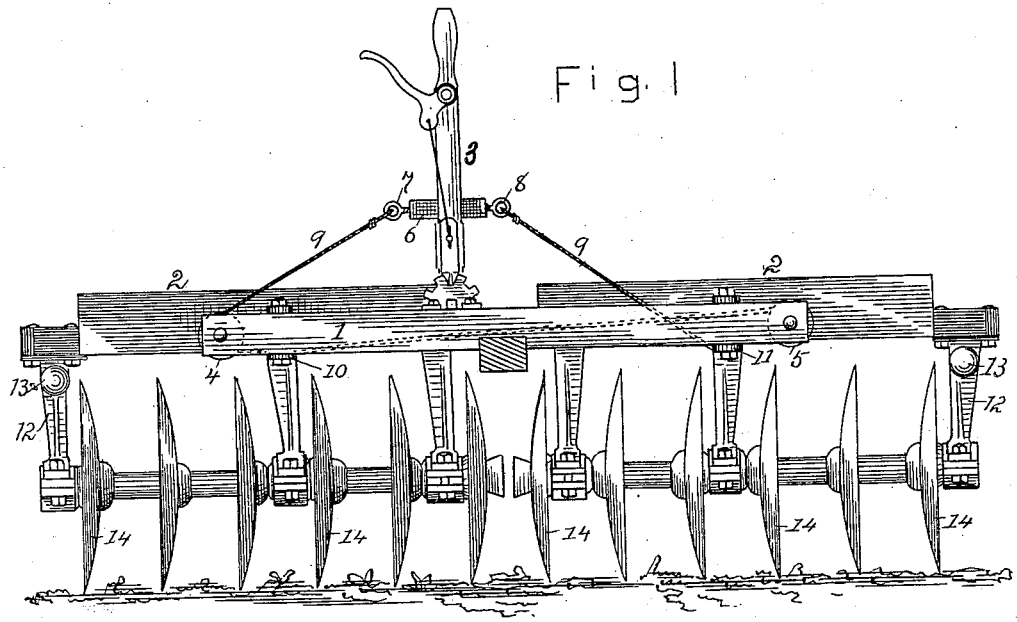
Figure 2:
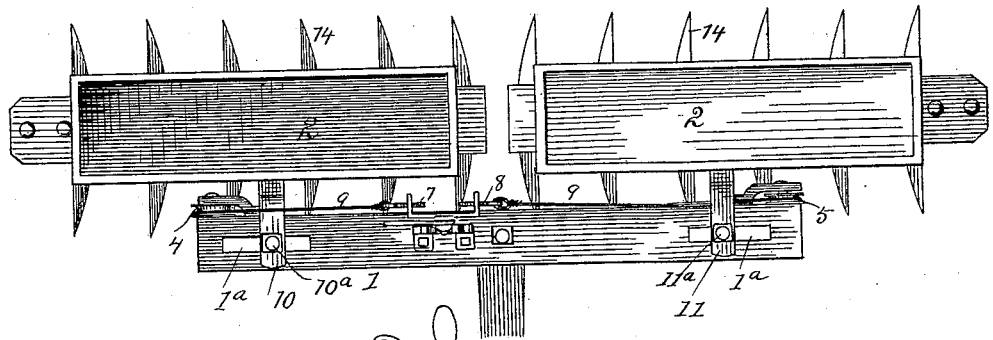
Figure 3:
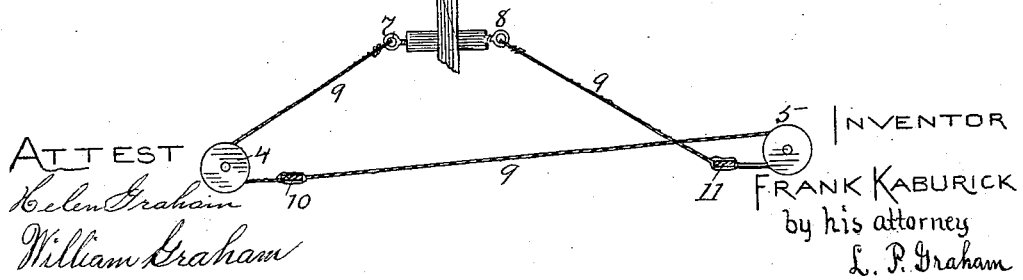

In the drawings accompanying and forming a part of this specification, Figure 1 is a front elevation of so much of a disk harrow as is necessary to explain the connection of my invention therewith. Fig. 2 is a plan of the same, and Fig. 3 is a detached elevation of essential elements.

The cross-bar 1 is suitably secured to the tongue, has slots $1^a$, and is also provided with pulleys 4 and 5. The weight-boxes of the harrow-frame are shown at 2. The lock-lever 3 has cross-bars 6, in the end of which eyebolts 7 and 8 are screwed. Draft-bars 10 and 11 of the harrow-frame have bolts $10^a$ and $11^a$, which extend through the slots of cross-bar 1 and provide slidable connections therewith. The line 9, which is preferably of wire rope, extends from eyebolt 7 to the upper surface of pulley 4, passes around such pulley and connects with draft-bar 10, extends to the upper surface of pulley 5, extends around such pulley and connects with draft-bar 11, and extends from there to eyebolt 8.

The harrow-frames have ordinary inner and intermediate standards, which connect with the shafts of disks 14. Outer standards 12 are detachably secured to the frames by removable bolts 13.

The harrow, as shown, is adapted for use as a pulverizer and leveler. To adapt it for use as a straddle-row cultivator, the outer standards are removed, the outer disks detached, and the standards replaced, which narrows the harrow sufficiently to enable it to operate each half between two rows without disturbing the grain growing in the rows. Next the lever is swung to one side and the rope, acting around the pulleys and on the bars 10 and 11 of the harrow-frames, separates such frames sufficiently to enable the inner disks to straddle a row. The tension of the rope is adjusted by means of the eyebolts, which may be screwed more or less into the cross-bar.

A harrow embodying my invention would be provided with the ordinary levers for adjusting the angle of the disk-frames, and these could be used to cause the frames to tend to run apart or together, if it should be desirable or necessary to shift the frames while the device was operating in soft ground. Before adjusting the disks, as above specified the harrow should be run onto hard ground at an end of the field and the driver should dismount, otherwise the resistance to side motion will be greater than the power of the shifting device.

I claim—

1. The combination of cross-bar 1, slotted at its ends and having pulleys 4 and 5, the draft-bars of the harrow-frame having bolts adapted to the slots of the cross-bar, the lock-lever, and the rope connecting with the lock-lever and with the draft-bars and extending around the pulleys, as set forth.

2. The combination of cross-bar 1, slotted at its ends and having pulleys 4 and 5, the draft-bars of the harrow-frame having bolts adapted to the slots of the cross-bar, the lock-lever, the cross-bar on the lever having the threaded eyebolts, and the rope 9, connected with the eyebolts and with the draft-bars and extending around the pulleys, as set forth.

In testimony whereof I sign my name in the presence of two subscribing witnesses.

FRANK KABURICK.

Attest:
ANDREW KABURICK,
JAMES K. FURBER.